(No Model.) 5 Sheets—Sheet 4.
J. DAVIS.
FILTER.
No. 402,658. Patented May 7, 1889.
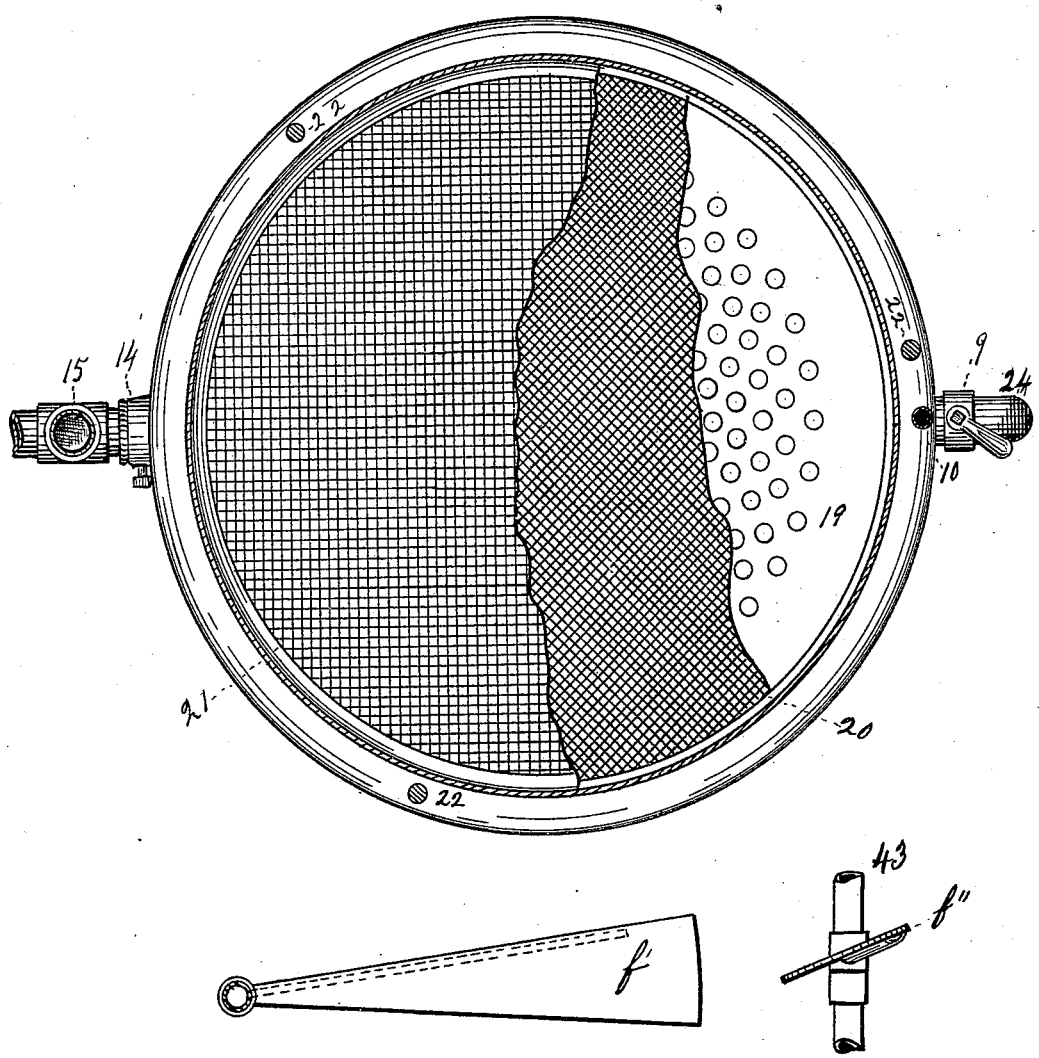

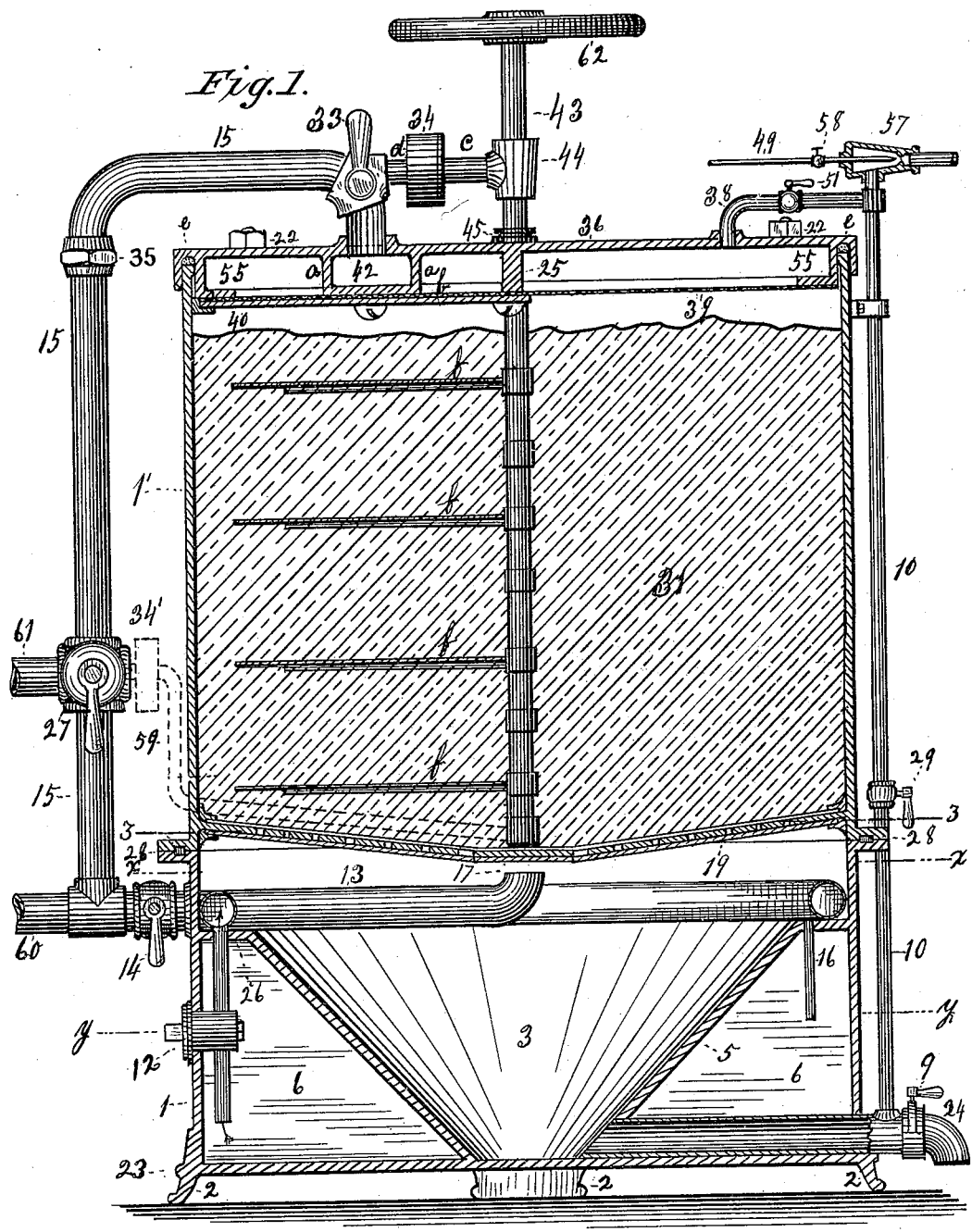

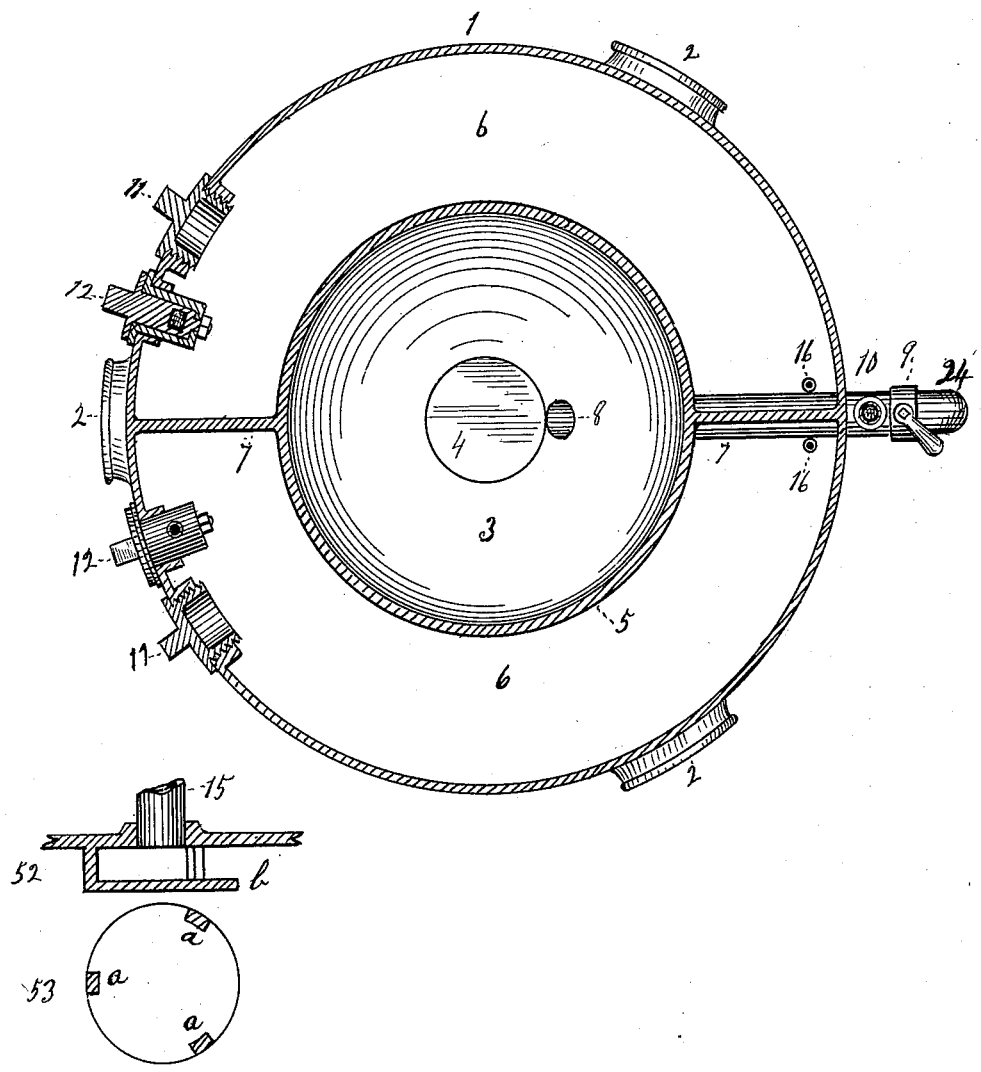

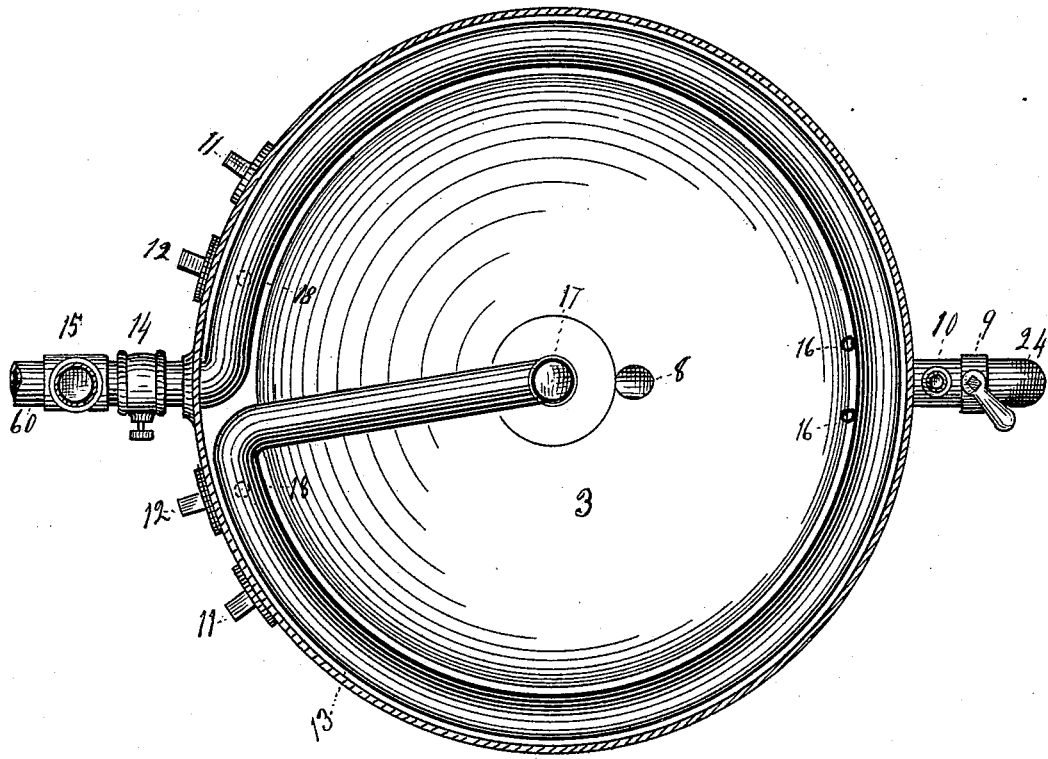

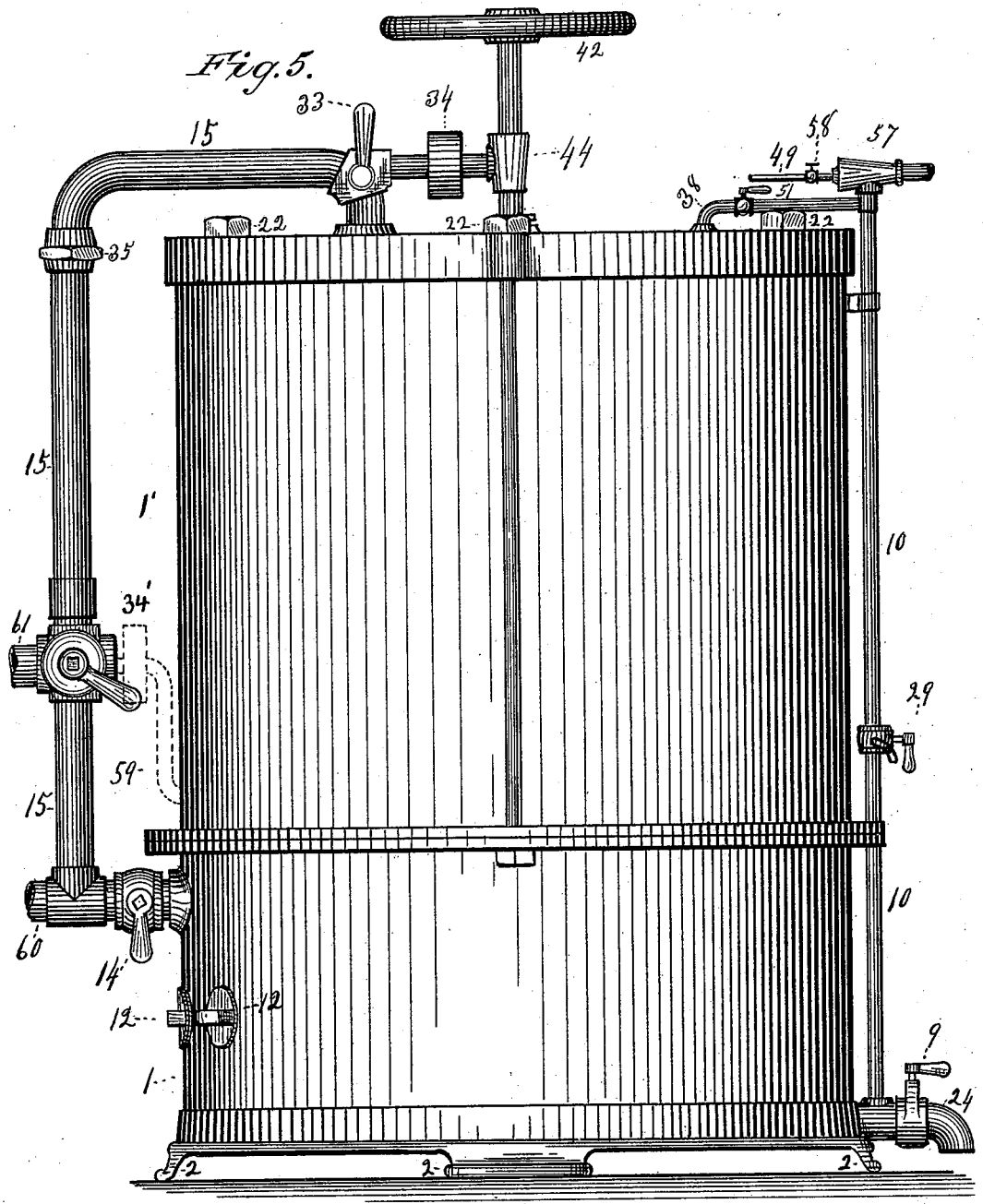

UNITED STATES PATENT OFFICE.

JOHN DAVIS, OF ALLEGHENY, PENNSYLVANIA.

FILTER.

SPECIFICATION forming part of Letters Patent No. 402,658, dated May 7, 1889.

Application filed November 29, 1886. Serial No. 220,215. (No model.)

*To all whom it may concern:*

Be it known that I, JOHN DAVIS, a citizen of the United States, residing in Allegheny and State of Pennsylvania, have invented certain new and useful Improvements in Filters, of which the following is a specification.

The object of my invention is, first, to construct a filter by which water and other liquids may be cleansed of their impurities, whether in solution or in suspension; second, that by the construction of the filter water or any other liquid may be conducted into the filter and mixed or combined with a chemical for imparting to the liquid certain qualities and the compound purified; third, that by it water and other liquids may be medicated and purified; fourth, that the filter may be constructed with simplicity of mechanism.

My invention consists in the hereinafter-described means for attaining the aforesaid objects, which are specifically herein set forth and pointed out in the claims.

The external body of my filter is cylindrical in form (it may have other forms) and composed of three parts—the lower section, 1, the upper section, 1', and the head 36—all three parts being jointed, water-tight, with the gaskets e and 28, and held firmly together by rods 22 22 22, as hereinafter described.

In the drawings, Figure 1 represents a vertical section; Fig. 2, a sectional plan on the line y y in Fig. 1; Fig. 3, a sectional plan on the line x x in Fig. 1; Fig. 4, a like view on the line 3 3 in Fig. 1, and Fig. 5 a front elevation.

Similar letters and similar numbers indicate corresponding parts throughout the different views.

As this filter is designed to filter water and other liquids under pressure—such as results from water conducted through pipes in cities from elevated reservoirs or from force-pumps—its parts should be made of metal and firmly fastened together.

1 represents the lower section of a hollow cylindrical shell with a bottom in it, to which bottom on the outside are attached short feet 2 2 2, on which the filter stands, and within it at the center of its bottom rests the small end of the frustum of a hollow cone, which small end is indicated by 4, and the circular wall of said frustum is represented by 5. This circular wall, in extending upward, is inclined at all points toward the inside surface of the cylindrical shell 1 of the filter at an angle of about forty-five degrees (it may be inclined at any desired angle) and terminates with a narrow horizontal flange, which is united, water-tight, with the inside surface of the cylindrical shell 1 of the filter, as may be seen by referring to 26 of Fig. 1, leaving the large end of the hollow conical frustum 5 open to receive all of the impurities of the liquid which is being filtered that may settle or be diverted into it.

8 represents the inner end of a waste-pipe, 24, which extends from the inside of the small and lower end of the hollow conical frustum 5 out through the shell of the filter. Near the outer end of this pipe is a cock or valve, 9, whose function is to regulate the flow of waste water from within said hollow frustum. On the upper side of pipe 24, between the cock 9 and the shell of the filter, is inserted another pipe, 10, which will be more fully described hereinafter. The space included between the bottom of the filter, the cylindrical shell 1 of the filter, the hollow conical frustum 5 and its flange 26, which is united, water-tight, with the inside surface of the cylindrical shell 1 of the filter, is divided into two compartments, 6 6, (but may be divided conveniently into more than two, if desired,) by two partitions, 7 7. Each, being on the opposite side of the filter from the other, is united, water-tight, to the bottom of the filter and to the outside surface of the hollow conical frustum 5; also to the under side of its flange, and also to the inside surface of the cylindrical shell 1 of the filter below the flange. These two compartments are receptacles for any element or elements, mixture or mixtures, compound or compounds, in a solid, dissolved, or liquid state, which it may be desirable to mingle with the water or other liquid as it passes through the circular pipe 13, which is inside of the filter, to be discharged from its orifice 17. (See Fig. 3.)

If the element or elements, mixture or mixtures, compound or compounds, which it may be desirable to mingle with the liquid that is being filtered, for the purpose of compounding or medicating or cleansing or changing its character, or for any other purpose, are soluble in it, they can be dissolved by it, as required, if put into either or both of these receptacles or compartments 6 6, which may readily be done through the openings 11 11, as both of the compartments 6 6 communicate with the compartment 3, which receives the liquid being filtered, as may be seen by referring to 3 and to 16 16, Fig. 3; but if the element or elements, mixture or mixtures, compound or compounds, which it is desirable to mingle with the liquid which is being filtered are not soluble by it, solutions of any or all of them may be made and put into the compartments 6 6 through the openings 11 11, which may be opened and closed at pleasure by screw-plugs or other convenient appliance.

12 12 represent cocks, the ground sleeves of which are permanently fixed in the cylindrical shell 1 of the filter. One cock belongs to each compartment 6, and connected with the sleeve of each on the under side is a short small tube which registers with the hole in the cock when open. On the upper side of the sleeve of each is a short small tube connected with it and registering with the cock when open. These tubes extend upward and pass through the flange 26, Fig. 1, of the inverted hollow frustum 5, and also through the wall of the circular pipe 13 inside of the filter, which pipe 13 rests on said flange, (see 18 18 in Fig. 3, also 26 in Fig. 1.) These tubes and the cocks 12 12, when open, form communications between both of the compartments 6 6 and the inside of the circular pipe 13, (see 18 18 in Fig. 3.) The object of these cocks is to regulate the flow through the small pipes connected with them of any desired liquids containing any desired substances which are capable of being dissolved from the compartments 6 6 into the water or other liquid which is being conducted around the inside of the filter by pipe 13, which flow from either or both of these compartments 6 6 is caused by the pressure of the liquid which is being filtered in the compartment 3 through the small pipes 16 16, which communicate with the compartments 6 6, together with the motion of the water or other liquid which is flowing into the compartment 3 through the pipe 13 inside of the filter.

In the sectional plan view, on the line *x x* in Fig. 1, 3 represents the compartment which receives the water or other liquid which is being filtered. 8 9 24 11 11 12 12 have been described. 10 will be described hereinafter.

13 represents a tube which extends around the shell of the filter on the inside, and then, turning nearly at a right angle, extends to the center of the compartment 3, where, through its orifice 17, which is turned upward, (it may be turned downward,) it discharges the liquids that pass through it. This pipe may have other forms besides the one represented in Fig. 3, provided there is cock or valvular communication between it and the compartments 6 6, or similar compartments.

The small dotted circles 18 18 represent the upper orifices of the small tubes connected with the cocks 12 12, which form communication between the pipe 13 and the compartments 6 6, which have been heretofore described.

16 16 represent the upper orifices of the tubes that form communication between the compartments 6 6 and the compartment 3, described above.

14 represents a cock or valve in the supply-pipe 60, which admits water or other liquids into the filter, and 15 represents a perpendicular pipe outside of cock 14, joined into the upper side of the supply-pipe, which will be described hereinafter.

In the sectional plan view 4, on the line 3 3 in Fig. 1, the parts 9, 14, and 24 have been described, and the parts 10 and 15 will be more fully described as we proceed. 19 represents a base to support the filter-bed, covered on the upper side with fine wire-cloth and on the under side with asbestus cloth, and perforated, except near its center and near its circumference, and united water-tight at its circumference to the inside surface of the upper cylindrical section, 1', of the filter, (see 19 in Fig. 1.) This base may be grating or strong wire-cloth inclined from its circumference toward its center, or not inclined, as desired. The openings in this base should be large enough to permit liquids to pass freely through it, and at the same time have sufficient strength to support all necessary filtering material—such as sand, granulated charcoal, granulated coke, or anything else suitable for the purpose. The upper side of this perforated base is covered with fine wire-cloth, so fine that it will not permit the filtering material to drop through it. The under side of the aforesaid base is covered with asbestus cloth, which may be removed, if necessary, in filtering the thicker liquids, such as fresh cider, &c. This cloth is preferable to all others, as it is not liable to change by the action of liquids or the elements they contain. The object of this cloth, placed where it is, is to prevent the impurities of the liquids being filtered from passing through the perforated base into the filter-bed, and also in connection with the reactionary motion of the liquid being filtered as it is discharged out of the orifice 17 against the solid central part of the perforated base to divert it toward the bottom of the compartment 3, that it may be carried away by the waste-pipe 24, which is kept partially open.

22 22 22 represent the bolts or rods to hold the head and body of the filter together. (See Figs. 3 and 4.)

Fig. 1 shows the relationship of nearly all of the parts of the filter to each other—the feet 2 2 2, connected to the bottom 23, the wall of the hollow conical frustum 5, with its small end resting on the bottom 23, and its flange 26 united to the inside surface of the lower section of the cylindrical shell 1 of the filter, the compartment 3, extending upward to the base 19, which supports the filter-bed 31, and is united near the lower end to the upper cylindrical section, 1', of the filter, the pipe 13, which rests on the flange 26 and conducts the liquids which are being treated and filtered around the filter within and then discharges them from its orifice 17 at its center, one of the small pipes which forms communication between compartment 3 and one of the compartments 6, the cock 12, and small tubes connected with it which form communication with the same compartment 6 and the inside of pipe 13 when the cock 12 is open; the two compartments 6 6 and the small tubes 16 16 and the cocks 12 12 and the openings 11 11 and pipe 13 have been heretofore described, and are clearly illustrated by Figs. 2 and 3. 1' represents a vertical sectional view of the upper section of the cylindrical shell of the filter, and 28 28 a gasket to prevent leakage from between the flanges of the lower and upper cylindrical sections of the filter when put together.

36 represents the head of the filter, and 42 the breakwater connected to the head underneath, a sectional elevation of which may be seen by referring to 53 beneath Fig. 2. This breakwater consists of three short projections, $a\ a\ a$, which are united to the under surface of the head 36 and extend downward. Connected with these projections beneath is a disk, $b$, making three lateral openings, which permit the water or other liquid coming in through pipe 15 above to be changed from a downward to a horizontal direction, thereby preventing the downward force of the incoming water, when it is desirable to run it in this direction, from disturbing or injuring the wire and asbestus cloths 40, which are placed horizontally beneath the disk $b$.

The wire-cloth is as large as the under surface of the head; but it may be less, and is attached to a circular rib, 55 55, which extends around the head inside of the cylindrical shell of the filter, also to the rib 25, which extends across at the middle of the head, and also to the disk of the breakwater. To that half of the wire-cloth which is attached to the breakwater, &c., is attached asbestus cloth, both of which are made water-tight, with the half of the circular rib 55 of the head, and the straight rib 25 across the middle of the head. The asbestus cloth is so arranged that it may be removed when the thicker liquids—such as sirups—are being filtered. The wire-cloth serves as a support for the asbestus cloth, which serves as a strainer, and also prevents the filter-bed from wasting; but when it is removed the wire-cloth alone prevents it from wasting. The other half, 39, of the wire-cloth prevents waste of the filter-bed as it is being cleansed. The circular rib described, together with the outer rim of the head, forms a groove for the rope-cord gasket $e\ e$, used to make the joint between the head and cylindrical shell 1' water-tight.

34 represents a small box with an opening in it which can be closed water-tight, connected with the cock 33 by pipe $d$, and also by the pipe $c$ to the ground sleeve 44 on the tubular shaft 43. In this box is placed asbestus fiber or other similar straining material, for the purpose of filtering water or other liquids which may be passed through it for cleansing the filter-bed.

34' is a similar device for a similar purpose, connected by a short pipe with cock 27 and with the lower end of the tubular shaft 43 by pipe 59. Either of these devices may be used for the other.

43, as stated heretofore, is a tubular shaft; 62, a hand-wheel on the upper end of it by which it is revolved, and 45 is a stuffing-box in the head of the filter through which the tubular shaft works water-tight.

$f\ f\ f\ f$ represent four vanes, each tubular at one end and fluted longitudinally, connected with the tubular shaft 43 above each other, or nearly so, also at regular spaces, or nearly so, by screwing their tubular ends into the tubular shaft 43, making communication out of the tubular shaft 43 through them into the filter-bed 31. A plan view of one of these vanes, for they are similar, and an end view of the same, together with a section of the tubular shaft 43, may be seen by referring to $f'$ and $f''$ beneath Fig. 4. The end of the vane which connects with the tubular shaft 43 is a tube. Outside of the connection the tube ends and the vane commences and widens to the other end.

On the under side of the vane and near to the back edge as it moves to the right in the filter is a groove, which is indicated by the dotted lines on $f'$ beneath Fig. 4, extending nearly the whole length of the vane. Additional similar grooves may be made in the vane, if desired.

$f''$, as stated, represents an end view of the vane $f'$, and this end view shows the angle about at which all the vanes are to be set with the perpendicular tubular shaft 43, with which they are connected and operated. The object in connecting these vanes with the tubular shaft 43 above each other, or nearly so, and having them inclined with their front edges the lowest when the hand-wheel which operates them is turned to the right, is that they may separate into sections and lift a vertical column of the filter-bed at each successive width of the vanes as they are passing through it, thereby making room, in connection with the grooves in the vanes, for the inflowing water through their tubular ends to be ejected to their outer extremities, whereby the whole filter-bed may be quickly and thoroughly cleansed.

60 represents the supply-pipe, and 15 a vertical pipe connected with it outside of the cock 14.

27 is a three-way cock in pipe 15, and 61 is the main outlet-pipe out of which the filtered or pure water or other purified liquids flow.

35 is a union in pipe 15, and in said pipe there is also another three-way cock, 33, to which pipe $d$ is connected. Pipe $d$ connects with box 34, and 34 connects with pipe $c$, which connects with the ground sleeve 44 on the tubular shaft 43. The tubular shaft 43 is perforated inside of the ground sleeve 44, which completes a water-way from the supply-pipe 60 to the lower end of the filter-bed, and also out into the filter-bed through the tubular ends of the vanes $f f f f$.

10 represents a waste-pipe with the three-way cock 29 in it, connected with the waste-pipe 24 between the filter and cock 9, and also connected with the waste-pipe 38, and extends above it. To the upper end of pipe 10 is secured a steam-ejector, 57—a pump may be substituted—with the steam-pipe 49 containing the cock 58 extending into it. The pipe 38, containing cock 51, connects with the head of the filter and with pipe 10, forming a water-way between the filter and pipe 10, which water-way is for the purpose of conveying waste water into the waste-pipe 10 when the filter-bed is being cleansed.

The necessity of placing a steam-ejector on the upper end of pipe 10 will be apparent when we consider the fact that it may be desirable at times to place the filter in the hold of a steamboat or ship below the surface of the stream or body of water that floats it, the filter also being supplied with water from the same stream or body of water; hence the necessity of elevating the waste water above the surface of the stream or body of water that floats the vessel, that it may be conveniently discharged outside of it.

In the front elevation, E, 2 2 2 represent the feet of the filter connected with the bottom of the lower section, 1. 22, 22, and 22 represent the rods which hold the two cylindrical sections 1 1' and the head together, and as all of the other parts of the filter have been described I will now proceed to show its operation.

When I wish to treat any desired liquid with any desired element or elements, mixture or mixtures, compound or compounds, for any desired purpose, I place this element or elements, mixture or mixtures, compound or compounds, or any of them, dissolved or undissolved, as circumstances may require, in the compartments 6 6; then by opening cock 14 the liquid to be treated and filtered is admitted into pipe 13 inside of the filter, which conveys it into compartment 3, from which some of it passes down through the small pipes 16 16 into the compartments 6 6 and mingles with their contents, dissolving what is soluble, if not already dissolved. These compartments 3 and 6 6 being filled and the liquid to be treated and filtered still pressing into compartment 3 through pipe 13, and the asbestus cloth and the filter-bed being above it and no free outlet for it, it is necessarily under pressure, which pressure, being communicated through the pipes 16 16 to the liquids in compartments 6 6, together with the motion of the liquid in pipe 13, causes them to flow into pipe 13 through the cocks 12 12, which regulate their flow.

Besides the pressure downward of the liquid in compartment 3, it presses upward through the asbestus cloth, perforated base, wire-cloth, and the filter-bed, leaving in compartment 3 the bulk of its impurities, to be carried out through the waste-pipe 24, whose cock is kept partially open, except when the waste water has to be siphoned or pumped out through pipe 10, in which case cock 9 should be kept closed. The liquid having passed through the filter-bed and being freed from its impurities, it passes out through asbestus cloth and wire-cloth 40, breakwater 42 into pipe 15, which conveys it through cock 33 and cock 27 into outlet-pipe 61, from which it is discharged.

When it is necessary to cleanse the filter-bed, cocks 14 in the inlet-pipe and 33 in pipe 15 and 9 in pipe 24 are shut and the cocks 27, 51, and 29 are opened. The first two permit the cleansing-liquid to pass through pipes 15 $d$, small filter 34, pipe $c$, into tubular shaft 43, from which it is discharged underneath the vanes $f f f f$, through their tubular ends into the filter-bed. As the cleansing-liquid is running into the filter-bed, the tubular shaft 43, to which the vanes $f f f f$ are attached, should be turned slowly to the right by the hand-wheel 62, that all of the filter-bed may be lifted in successive broken columns, which will, in connection with the grooves underneath the vanes, permit the cleansing-liquid to be ejected from the tubular shaft 43 through the inner tubular ends of the vanes $f f f f$, to their outer extremities, thereby bringing the cleansing-liquid into direct contact with all of the filter-bed, and thoroughly cleansing it from whatever impurities may have lodged in it. While this cleansing process is going on pipe 38 and part of pipe 10 are conducting the impure water to cock 29, by which it is discharged. If it is desirable to pass strained water down through the bed for cleansing purposes, it can be done (as asbestus cloth is above the bed) by closing cocks 14 and 51 and opening cocks 33, 9, and 27; or if it is desirable to pass water up through the bed for cleansing purposes, it can be done by closing cocks 27 and 9 and opening cocks 14 and 51 and 29, where it will be discharged.

In case the steam-ejector is necessary to remove the impure water resulting from cleansing the filter-bed, by opening cock 51 and closing cocks 29 and 24, the impure water will flow through pipe 38 into pipe 10, from which the ejector will remove it. If the flow of water is downward in cleansing the filter-bed, by closing cocks 51 and 9 and opening cock 29, so as to allow the water to ascend through pipe 10, the ejector will remove it, and if cock 51 is also opened it will remove the waste water from both ends of the filter at the same time.

In another application, Serial No. 245,716, filed July 30, 1887, I have claimed matter herein shown but not specifically claimed, and in my application Serial No. 291,377 I have claimed a coagulating and precipitating chamber, a chemical-chamber, and suitable connections for supplying and charging water with chemicals and for discharging purified water.

Having described my invention, what I claim is—

1. In a filter, the combination of a supply-pipe, a receiving and precipitating chamber, a chamber for containing chemicals, a circulating-pipe supported above the latter chamber and communicating therewith, and a filter-chamber above said chemical-chamber and within the same vessel, substantially as described.

2. In a filter, the combination of a supply and a circulating pipe, a combined receiving and precipitating chamber, a chamber for containing chemicals, a pipe communicating with both of said chambers, a sediment-discharge pipe communicating with the precipitating-chamber, and a filter-bed above said chamber and within the same vessel, substantially as described.

3. In a filter, the combination of a supply and a circulating pipe, a combined receiving and precipitating chamber, a chamber for containing chemicals, a pipe connecting said chambers, a separate pipe for conducting fluid from the chemical-chamber to the circulating-pipe, and a filter-bed above said chambers and circulating-pipe and within the same vessel, substantially as described.

4. In a filter, the combination of a supply and a circulating pipe, a receiving and precipitating chamber, a chamber for containing chemicals, means of communication between said chambers, a separate pipe for conducting liquid from the chamber containing the chemicals to the circulating-pipe, suitable means for regulating the quantity of fluid from said chamber to said pipe, and a filter-bed above said chambers and pipes and within the same vessel, substantially as described.

5. In a filter, the combination of a supply-pipe, a receiving and precipitating chamber, a filter-chamber, an interposed straining-diaphragm, a chamber for containing chemicals, and a circulating-pipe communicating with the chemical-chamber and the receiving-chamber and within the same vessel, substantially as described.

6. In a filter, the combination of a supply and a circulating pipe, a concentric conical precipitating-chamber, an annular chamber for containing chemicals, pipes for conducting liquid to the latter chamber, and pipes for conducting liquid impregnated with chemicals into the circulating-pipe, substantially as described.

7. A filter provided with a chamber having a conical compartment to receive precipitated sediment, a discharge-pipe communicating with the small end thereof, and an annular supply-pipe supported above said sediment-chamber and discharging at or near the center of the receiving-chamber, in combination with a filter-bed above said parts, and a discharge-pipe for filtered liquids, substantially as described.

8. In a filter, a receiving and precipitating chamber, an annular chamber divided into separate compartments for containing different kinds of chemicals, a supply and a circulating pipe communicating with each of the several compartments and discharging into the receiving-chamber, in combination with a filter-bed above said chambers, and a suitable discharge-outlet, substantially as described.

9. In a filter, the combination of a supply-pipe, a sediment-chamber, a chamber for containing chemicals, pipes for conducting liquids to and from the latter chamber, a filter-bed, a separate chamber for the filtered liquid provided with a breakwater, and a discharge-pipe communicating with said separate chamber, substantially as described.

10. In a filter, the combination of a supply-pipe, a filter-bed, a sediment-chamber below and a purified-water chamber above said filter-bed, and an ejector connected to both of said chambers for raising sediment from one or discharging purified water from the other, substantially as described.

11. In a filter, the combination of a filter-bed, an agitator provided with a hollow shaft extending through said bed and provided with a series of vanes arranged in different horizontal planes and at an angle to a horizontal plane, and having a groove or grooves on their lower surfaces for conducting liquid to the outer extremities of said vanes, substantially as described.

JOHN DAVIS.

Witnesses:
O. D. LEVIS,
JNO. H. RONEY.